United States Patent
Atsuta

(10) Patent No.: US 6,177,753 B1
(45) Date of Patent: *Jan. 23, 2001

(54) VIBRATION WAVE MOTOR

(75) Inventor: Akio Atsuta, Yokosuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/852,030

(22) Filed: May 6, 1997

Related U.S. Application Data

(63) Continuation of application No. 08/324,969, filed on Oct. 18, 1994, now abandoned.

(30) Foreign Application Priority Data

Oct. 19, 1993 (JP) .................................................. 5-261149

(51) Int. Cl.[7] .................................................. H01L 41/08
(52) U.S. Cl. ............................. 310/316.01; 310/316.02
(58) Field of Search .............................. 310/316, 317, 310/319, 323; 318/116

(56) References Cited

U.S. PATENT DOCUMENTS

| | | | | |
|---|---|---|---|---|
| 4,980,597 | * | 12/1990 | Iwao ....................................... | 310/319 |
| 5,231,325 | * | 7/1993 | Tamai et al. .......................... | 310/323 |
| 5,376,858 | * | 12/1994 | Imabayashi et al. ............ | 310/323 X |
| 5,438,229 | * | 8/1995 | Ohtsuchi et al. ..................... | 310/316 |
| 5,477,100 | * | 12/1995 | Kataoka ................................ | 310/323 |

* cited by examiner

*Primary Examiner*—Mark O. Budd
(74) *Attorney, Agent, or Firm*—Fitzpatrick, Cella, Harper & Scinto

(57) ABSTRACT

A vibration detection piezoelectric element and a driving piezoelectric element are connected to each other without sandwiching an insulation member or a ground electrode therebetween. vibration wave motor accurately detects a vibration state of the motor by arranging a cancel circuit for canceling a driving frequency signal component included in an output from the detection piezoelectric element.

11 Claims, 15 Drawing Sheets

US 6,177,753 B1

VIBRATION WAVE MOTOR

This application is a continuation of application Ser. No. 08/324,969, filed Oct. 18, 1994, now abandoned.

BACKGROUND OF THE INVENTION

1. Field of the Invention

The present invention relates to a driving device for a vibration type motor which utilizes a resonance of a vibration member.

2. Related Background Art

In recent years, a vibration type motor called an ultrasonic wave motor, a piezoelectric motor, or a vibration wave motor has been developed, and has been put into practical applications by the present applicants. As is well known, the vibration type motor is a non-electromagnetic driven type motor, in which AC voltages are applied to electro-mechanical energy conversion elements such as piezoelectric elements or electrostrictive elements to cause such elements to generate a high-frequency vibration, and the vibration energy is picked up as a continuous mechanical motion.

FIG. 13 is a side view which shows a conventional bar-shape ultrasonic wave motor, and also shows the arrangement of wiring lines for supplying voltages to piezoelectric elements arranged in the motor, and for extracting an output voltage therefrom. A vibration member 1 constitutes the bar-shape ultrasonic wave motor, and comprises a coupled structure of piezoelectric or electrostrictive elements and an elastic member.

The piezoelectric element portion of the vibration member 1 is constituted by A- and B-phase driving piezoelectric elements a1, a2, b1, and b2, and a vibration detection piezoelectric element S. When an A-phase applied voltage is applied to a portion sandwiched between the A-phase piezoelectric elements a1 and a2, and a B-phase applied voltage is applied to a portion sandwiched between the B-phase piezoelectric elements b1 and b2, the piezoelectric elements are driven. Also, the rear sides of the A- and B-phase piezoelectric elements a1, a2, b1, and b2 are connected to the GND potential. One surface of the vibration detection piezoelectric element S is similarly connected to the GND potential, and a signal is output from the other surface thereof. The signal output surface of the vibration detection piezoelectric element S contacts a metal block. The block is insulated from the GND potential by an insulation sheet. Therefore, the vibration detection piezoelectric element S can directly output an electric power voltage corresponding to a vibration generated therein. A resonance frequency or the like is calculated on the basis of the magnitude of the output voltage or its phase difference from a driving voltage.

FIG. 14 shows a driving circuit for such a vibration wave motor. The driving circuit comprises driving electrodes A and B for applying AC voltages to the piezoelectric or electrostrictive elements, an oscillator 2 for generating an AC voltage, a 90° phase shifter 3, switching circuits 4A and 5B for switching AC voltages from the oscillator and the phase shifter by a power supply voltage, and booster coils 6 and 7 for amplifying pulse voltages switched by the switching circuits 4A and 5B. The driving circuit also includes a phase difference detector 8 for detecting a signal phase difference between the driving electrode A and a vibration detection electrode S.

The driving circuit further includes a control microcomputer 10. FIG. 15 is a waveform chart showing signals from the driving electrode A and the vibration detection electrode S shown in FIG. 14.

The control microcomputer 10 supplies a command to the oscillator 2 to generate an AC voltage having a given frequency at which the vibration wave motor is to be driven. The signals output from the driving electrode A and the vibration detection electrode S have regular sine waveforms, as shown in FIG. 15. Therefore, the phase difference detector 8 can output a signal corresponding to the phase difference at that time to the microcomputer 10. The microcomputer 10 detects a current difference from a resonance frequency on the basis of the input signal, and controls a drive of the motor at an optimal frequency. In this manner, the driving frequency can be controlled.

When such a bar-shape vibration wave motor includes an odd number of driving piezoelectric elements, as shown in FIG. 16, a driving voltage is undesirably applied to a vibration member portion, and an appropriate detection output cannot be obtained even if a vibration detection piezoelectric element is simply stacked on the driving piezoelectric elements.

Also, a problem of an increase in driving voltage is posed since the vibration wave motor uses piezoelectric elements. As a countermeasure against this problem, a method which adopts a floating structure shown in FIG. 17 to halve the conventional driving voltage has been proposed.

FIG. 18 shows a driving circuit for such a vibration wave motor. The driving circuit comprises driving electrodes A, A', B, and B' for applying AC voltages to the piezoelectric or electrostrictive elements, an oscillator 2 for generating an AC voltage, a 90° phase shifter 3, switching circuits 4A, 4A', 5B, and 5B' for switching AC voltages from the oscillator and the phase shifter by a power supply voltage, and booster coils 6 and 7 for amplifying pulse voltages switched by the switching circuits 4A, 4A', 5B, and 5B'.

The driving circuit also includes a control microcomputer 10. The control microcomputer 10 supplies a command to the oscillator 2 to generate an AC voltage having a given frequency at which the vibration wave motor is to be driven. At this time, the switching circuits 4A, 4A' having a 180° phase difference to applied voltages therebetween, and 5B, 5B' also having a 180° phase difference of applied voltages therebetween, switch input signals to electrodes A, A' or B, B' at the input timings. In this case, a voltage twice the power supply voltage is apparently applied to the driving electrodes A, A', B, and B' via the coils. Therefore, the piezoelectric elements can be driven by a voltage half that required in the conventional motor. However, even when the floating structure is adopted, the above-mentioned problem is posed upon arrangement of the detection piezoelectric element.

As described above, in the vibration type motor structure shown in FIG. 16 or 17, even when the vibration detection piezoelectric element S is simply stacked on the driving piezoelectric elements as in the conventional method, a vibration cannot be appropriately detected.

SUMMARY OF THE INVENTION

One aspect of the present invention has been made in consideration of the above situation, and has as its object to provide a driving device for a vibration type motor, which comprises a cancel circuit for canceling a voltage of a driving frequency signal component included in the output from a vibration detection piezoelectric element so as to obtain an appropriate vibration detection output.

One aspect of the present invention is to provide, based on the above object, a vibration type device which synthesizes or subtracts between a driving frequency signal applied to driving piezoelectric elements and a detection piezoelectric element output to obtain an accurate-detection output as the driving piezoelectric element output.

Other objects of the present invention will become apparent from the following description of the embodiments taken in conjunction with the accompanying drawings.

BRIEF DESCRIPTION OF THE DRAWINGS

FIG. 6, including

DESCRIPTION OF THE PREFERRED EMBODIMENTS

Figure 1:
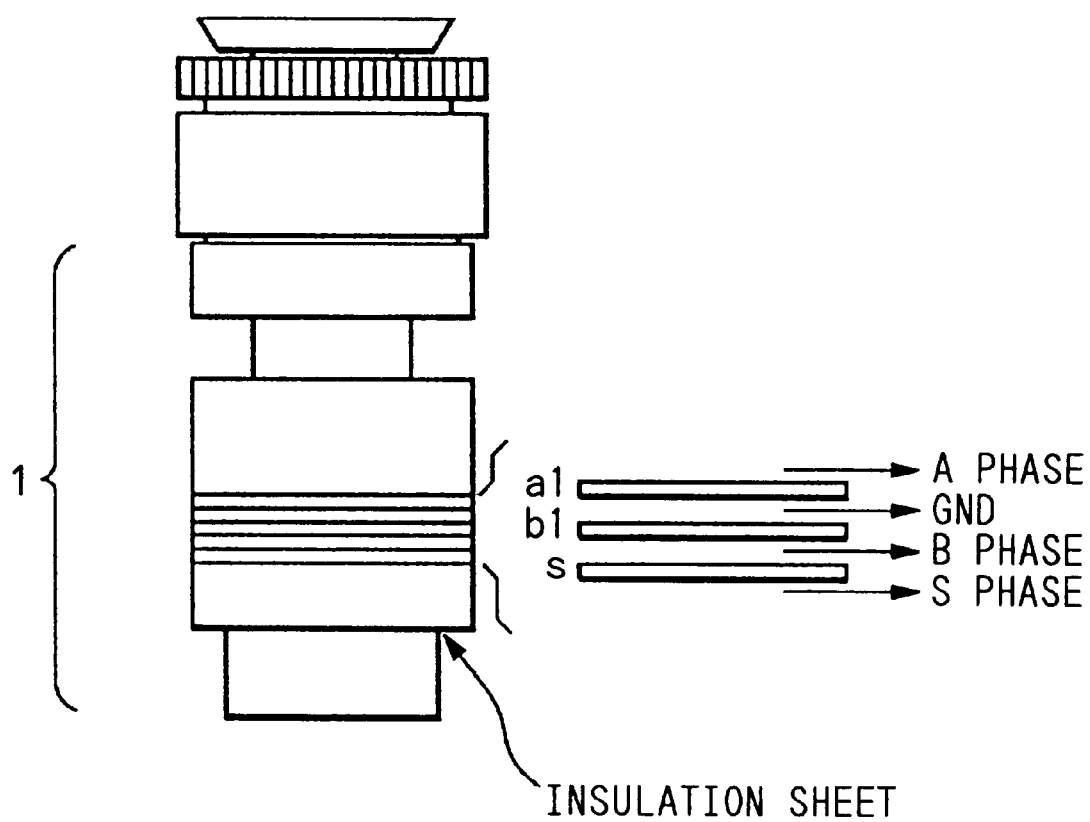
FIG. 1 is a side view of a bar-shape ultrasonic wave motor according to the first embodiment of the present invention.

FIG. 1 is a side view which shows a bar-shape ultrasonic wave motor according to the first embodiment of the present invention, and also shows the arrangement of wiring lines for supplying voltages to piezoelectric elements arranged in the motor and for extracting an output voltage therefrom.

Figure 2:
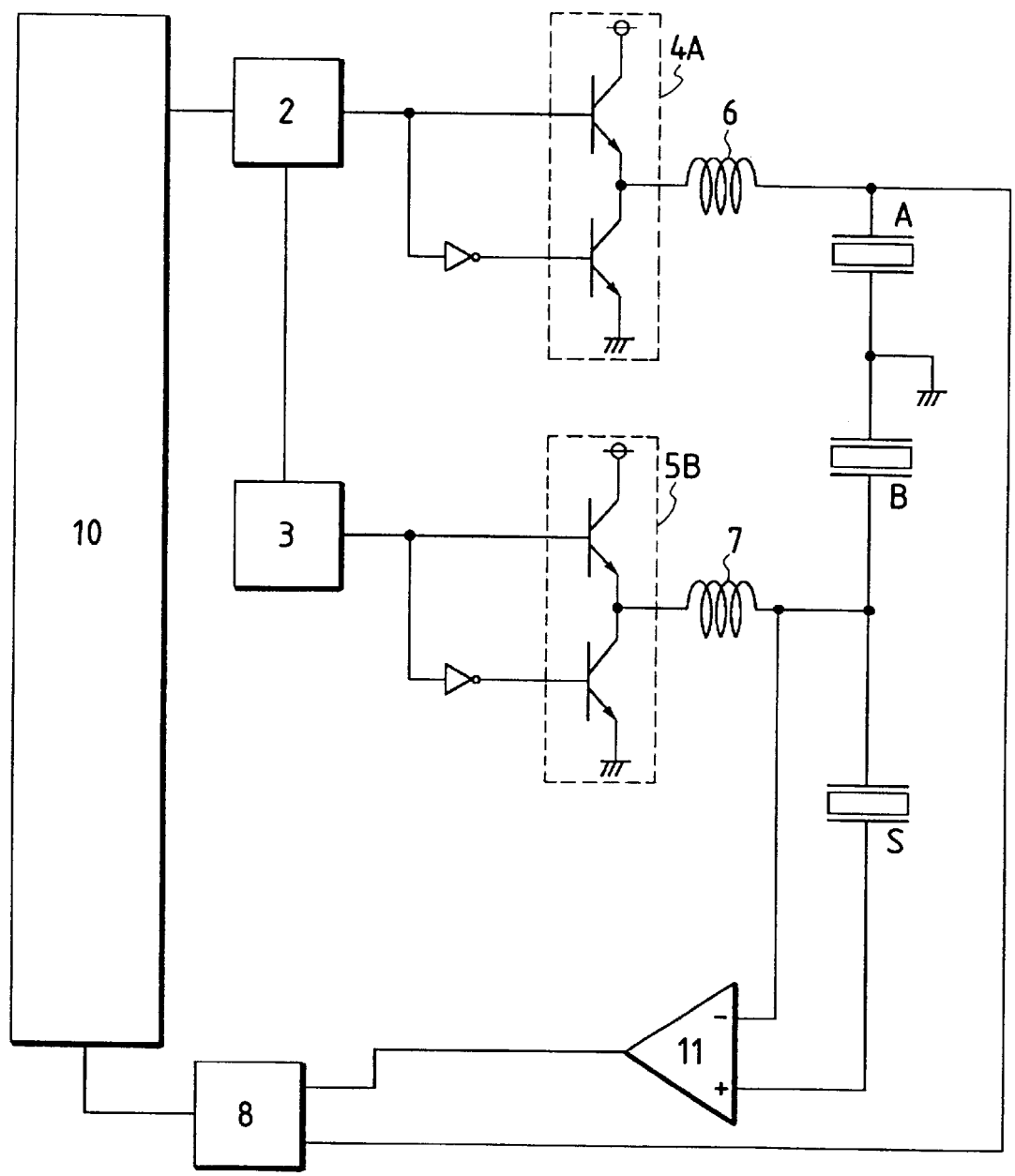
FIG. 2 is a block diagram showing a circuit according to the first embodiment of the present invention.
Figure 16:
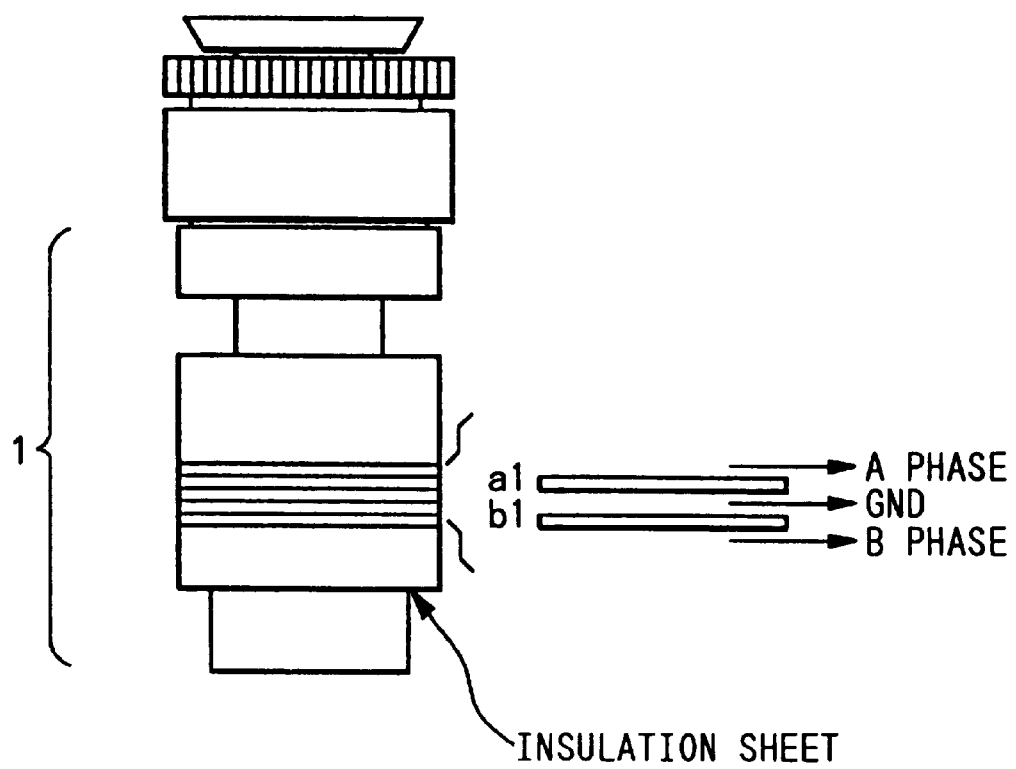
FIG. 16 is a side view showing another conventional bar-shape ultrasonic wave motor.

FIG. 2 is a block diagram showing a circuit portion for driving the motor shown in FIG. 1 and a circuit portion for detecting a vibration generated therein. The driving portion in FIG. 1 is the same as that in the prior art shown in FIG. 16. In this embodiment, a vibration detection piezoelectric element s is arranged on a surface, to which a B-phase voltage is applied, of a B-phase driving piezoelectric element, and an electrode S for extracting a signal from the vibration detection piezoelectric element s is arranged at the opposite surface.

Figure 3:
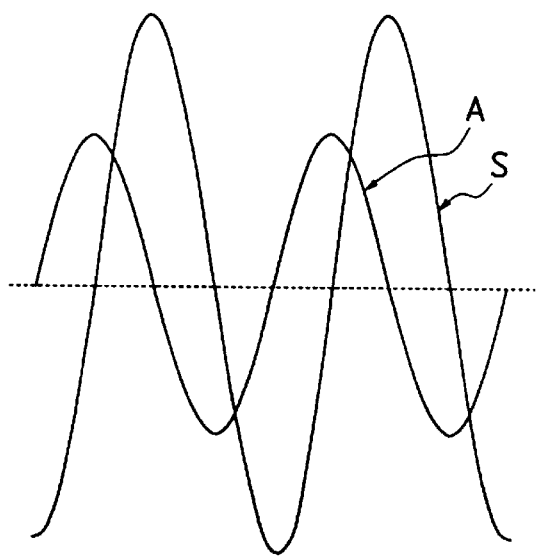
FIG. 3 is a waveform chart showing the outputs from electrodes A and S in the first embodiment.

A difference between the circuit in FIG. 2 and the prior art is that a differential amplifier 11 is arranged between a driving electrode B and the vibration detection electrode S. FIG. 3 is a waveform chart showing the outputs from the driving electrode A and the vibration detection electrode S.

Figure 15:
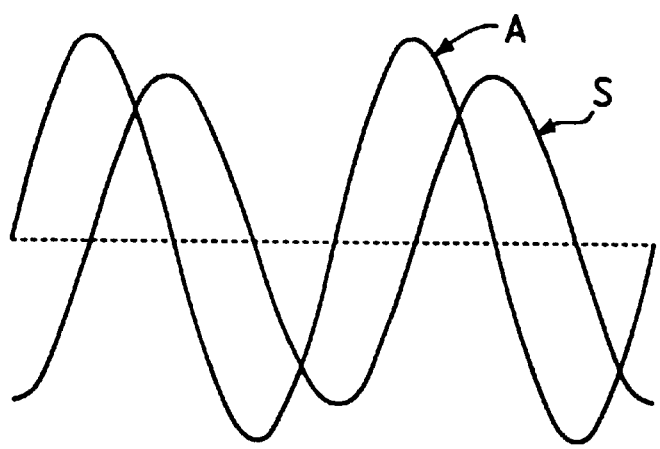
FIG. 15 is a waveform chart for explaining the operation of the motor shown in FIG. 14.

The output from the vibration detection electrode S has a waveform obtained by superposing a voltage component applied to the opposite side of the piezoelectric element on a sine waveform. More specifically, the output from the vibration detection electrode S has a waveform obtained by superposing a vibration detection signal and a B-phase driving waveform. Therefore, by removing the superposed waveform component by the differential amplifier 11, the same sine waveform as that shown in FIG. 15 can be obtained. When this signal is used as the vibration detection signal, the motor can be driven at an optimal frequency as in the prior art.

Figure 4:
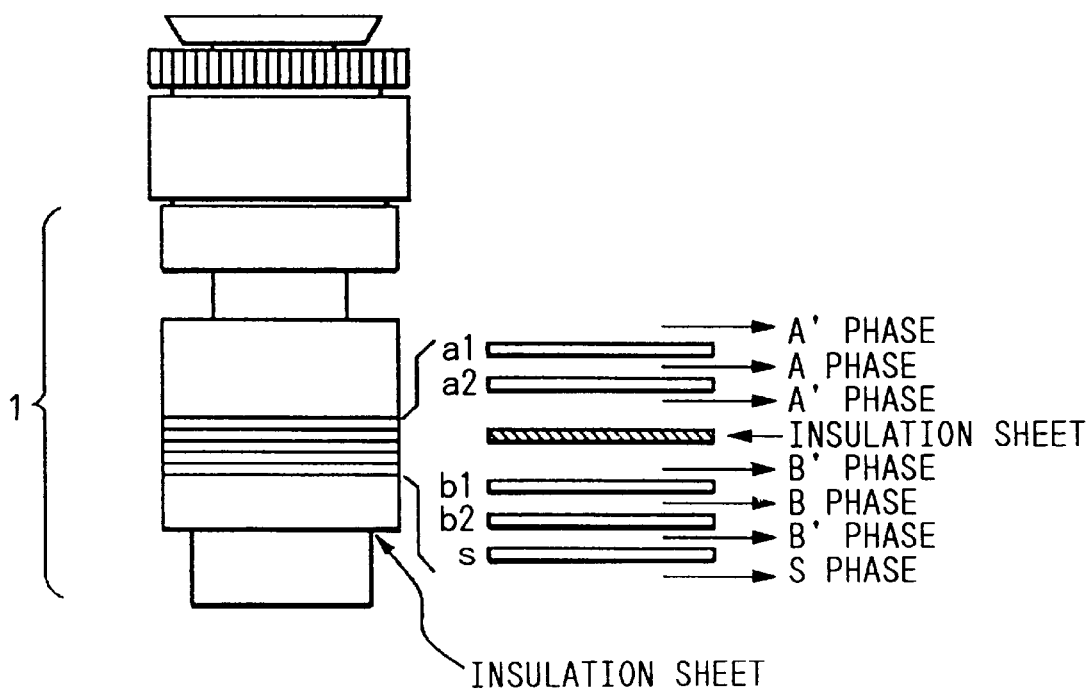
FIG. 4 is a side view of a bar-shape ultrasonic wave motor according to the second embodiment of the present invention.

FIG. 4 is a side view which shows a bar-shape ultrasonic wave motor according to the second embodiment of the present invention, and also shows the arrangement of wiring lines for supplying voltages to piezoelectric elements arranged in the motor and for extracting an output voltage therefrom.

Figure 5:
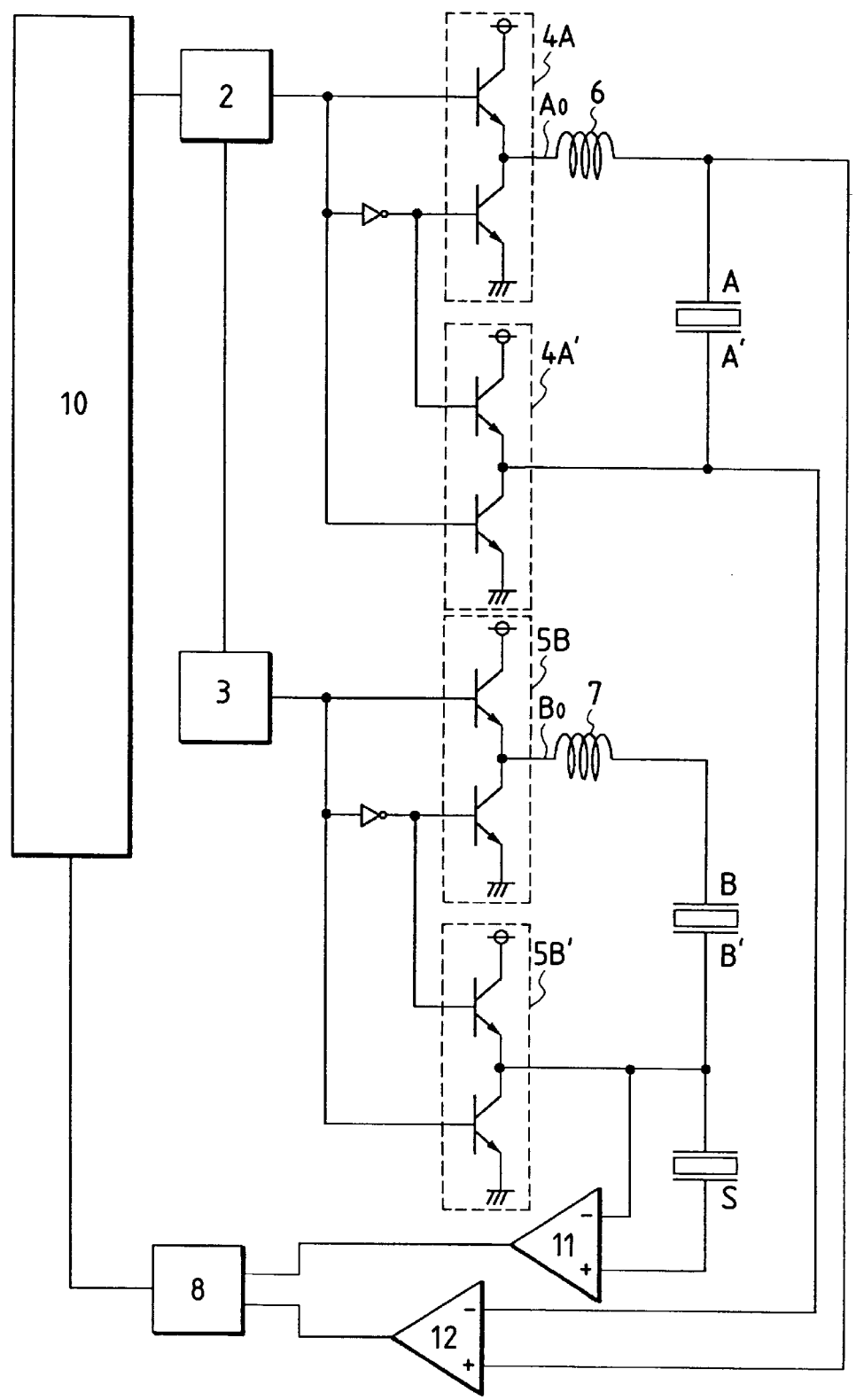
FIG. 5 is a block diagram showing a circuit according to the second embodiment of the present invention.
Figure 6A:
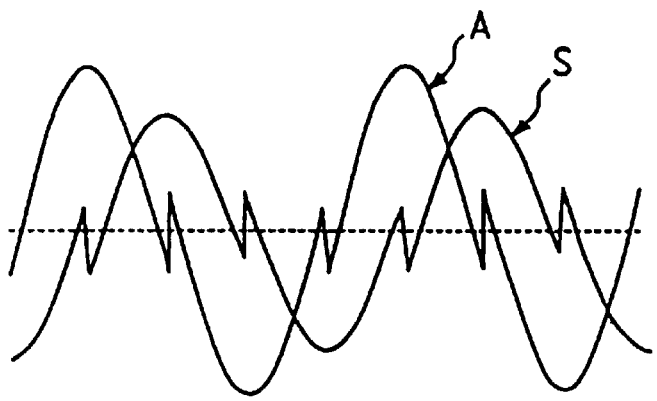
FIGS. 6(a) to 6(f) is a waveform chart for explaining the operation of the second embodiment.
Figure 6B:
Figure 6C:
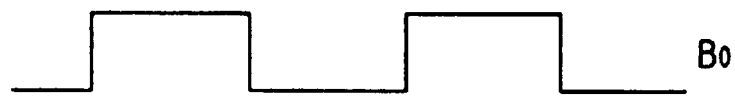
Figure 6D:
Figure 6E:
Figure 6F:
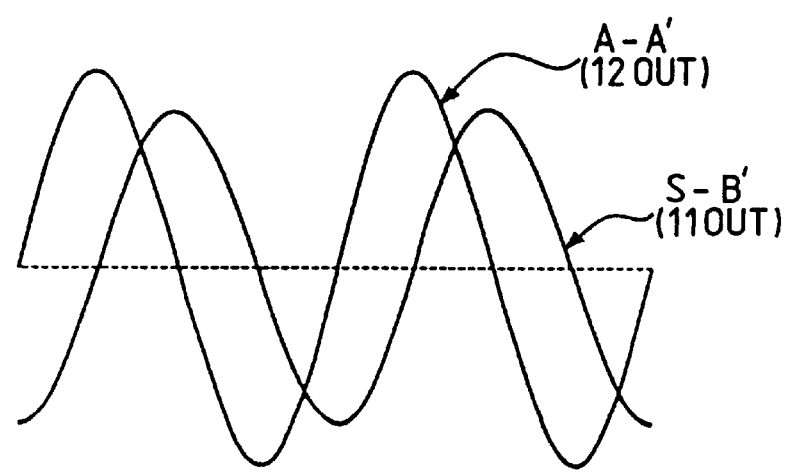
Figure 17:
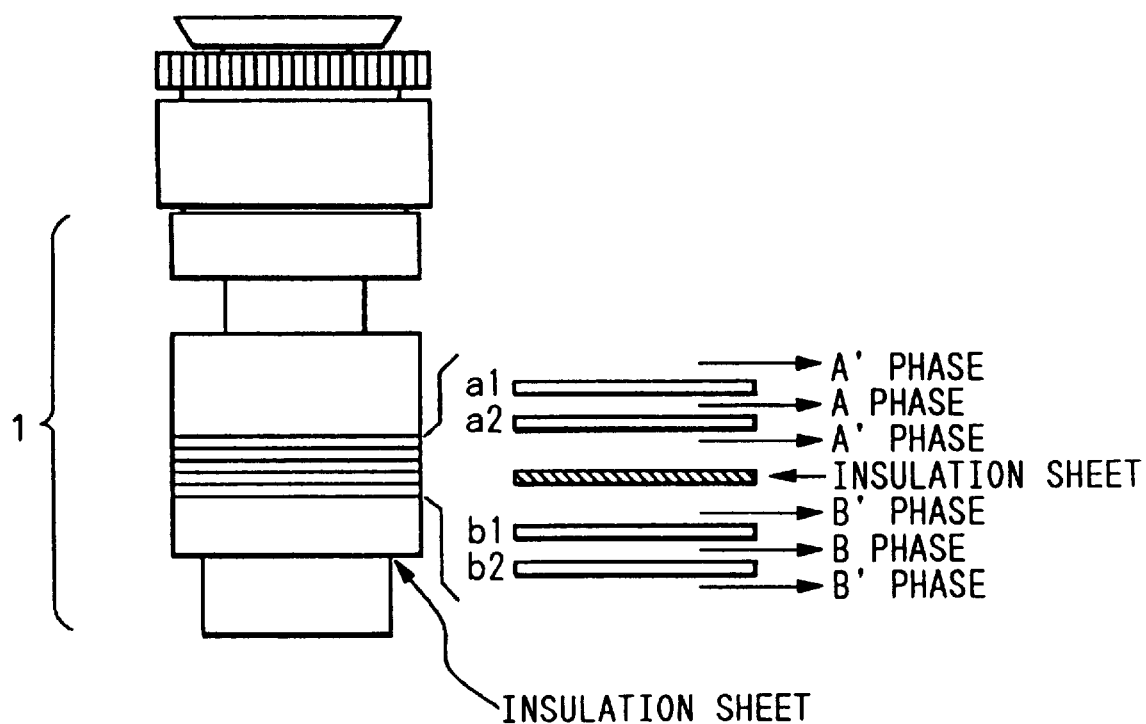
FIG. 17 is a side view showing the floating structure of the conventional bar-shape ultrasonic wave motor.

FIG. 5 is a block diagram showing a circuit portion for driving the motor shown in FIG. 4 and a circuit portion for detecting a vibration. The driving portion in FIG. 4 is the same as that in the prior art shown in FIG. 17. In this embodiment, a vibration detection piezoelectric element s is arranged on a surface, to which a B'-phase voltage is applied, of a B-phase driving piezoelectric element, and an electrode S for extracting a signal from the vibration detection piezoelectric element s is arranged at the opposite surface.

Figure 18:
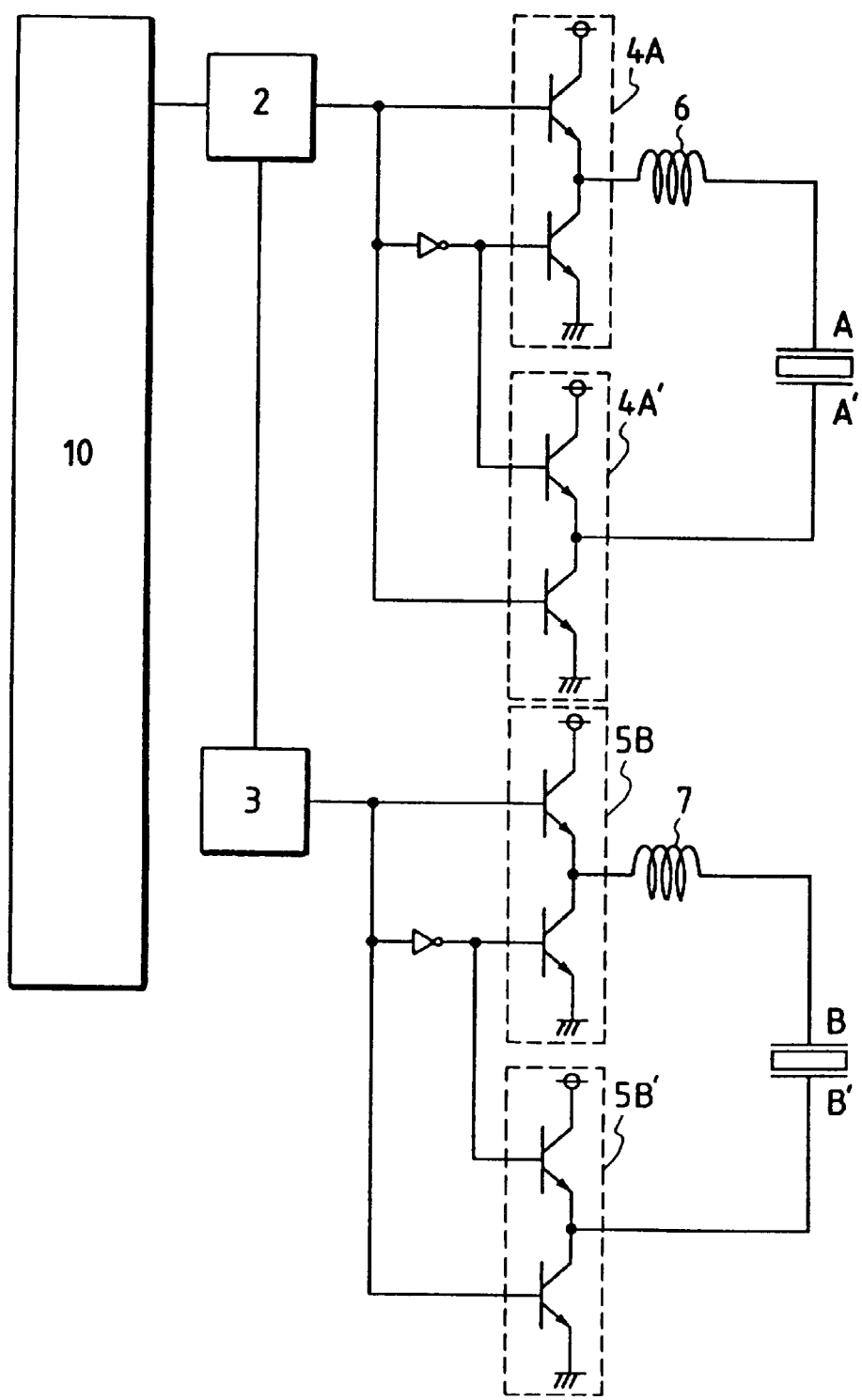
FIG. 18 is a block diagram showing a circuit of the conventional floating structure.

A difference between the circuit in FIG. 5 and the conventional circuit shown in FIG. 18 is that differential amplifiers 11 and 12 are respectively arranged between driving electrodes A and A', and between a driving electrode B' and the vibration detection electrode S. FIG. 6, including FIGS. 6(a) to 6(f) is a waveform chart showing the outputs from portions A, A0, A', B0, and B', and the output from the vibration detection electrode S in FIG. 5. A signal A0 from a switching circuit 4A has a 180° phase difference from a signal A' from a switching circuit 4A'. Signals B0 and B' from switching circuits 5B and 5B' have a 90° phase difference from the signal from the circuit 4A, and they have a 180° phase difference therebetween. The outputs from the driving electrode A and the vibration detection electrode S have waveforms each obtained by superposing a voltage component (i.e., A or B') applied to the opposite side of the corresponding piezoelectric element on a sine waveform. Therefore, by removing the superposed waveform components using the differential amplifiers 11 and 12, regular sine waveforms like waveforms A–A' and S–B' in FIG. 6(f) can be obtained.

In this manner, a voltage applied across the two terminals of the driving piezoelectric element and a voltage obtained across the two terminals of the vibration detection piezoelectric element s are obtained, and a phase difference between these voltages is detected by a phase difference detector 8, thus detecting regular phase difference characteristics. The microcomputer 10 detects the current difference from a resonance frequency on the basis of the signal from the detector 8, and controls the motor to drive it at an optimal frequency.

Figure 7:
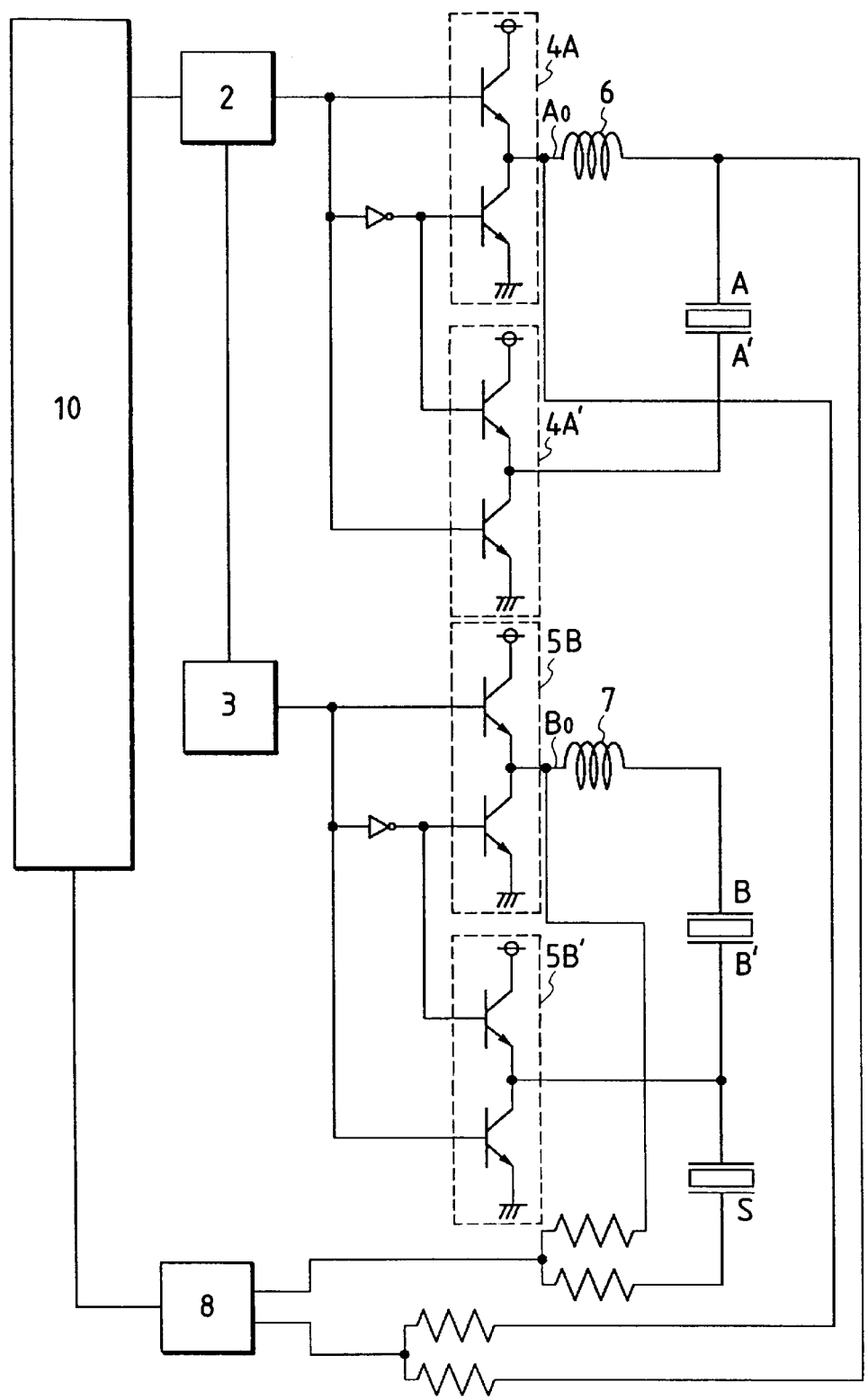
FIG. 7 is a block diagram showing a circuit according to the third embodiment of the present invention.

FIG. 7 is a block diagram showing a circuit according to the third embodiment of the present invention.

In the third embodiment, a voltage across the two terminals of the piezoelectric element is detected without using any differential amplifier. In place of subtracting a signal, a signal having a phase opposite to the signal is added to the signal after impedance matching. More specifically, in the second embodiment, a voltage B' applied to the opposite side of the vibration detection piezoelectric element s is subtracted from the output from the electrode S of the vibration detection piezoelectric element s. In place of subtraction, a signal B0 having a phase opposite to that of the signal B' is added to the output from the electrode S. Also, a signal A0 having a phase opposite to that of a signal A' is added to the output from the driving electrode A. In this manner, by utilizing original signals, a resonance frequency can be detected by a simple circuit which does not require any differential amplifier.

In FIG. 7, as an impedance element, only one resistor is connected to each signal extraction portion. However, in practice, a voltage-dividing circuit for decreasing a voltage, and impedance elements such as coils, capacitors, and the like may often be connected to achieve impedance matching.

Figure 8:
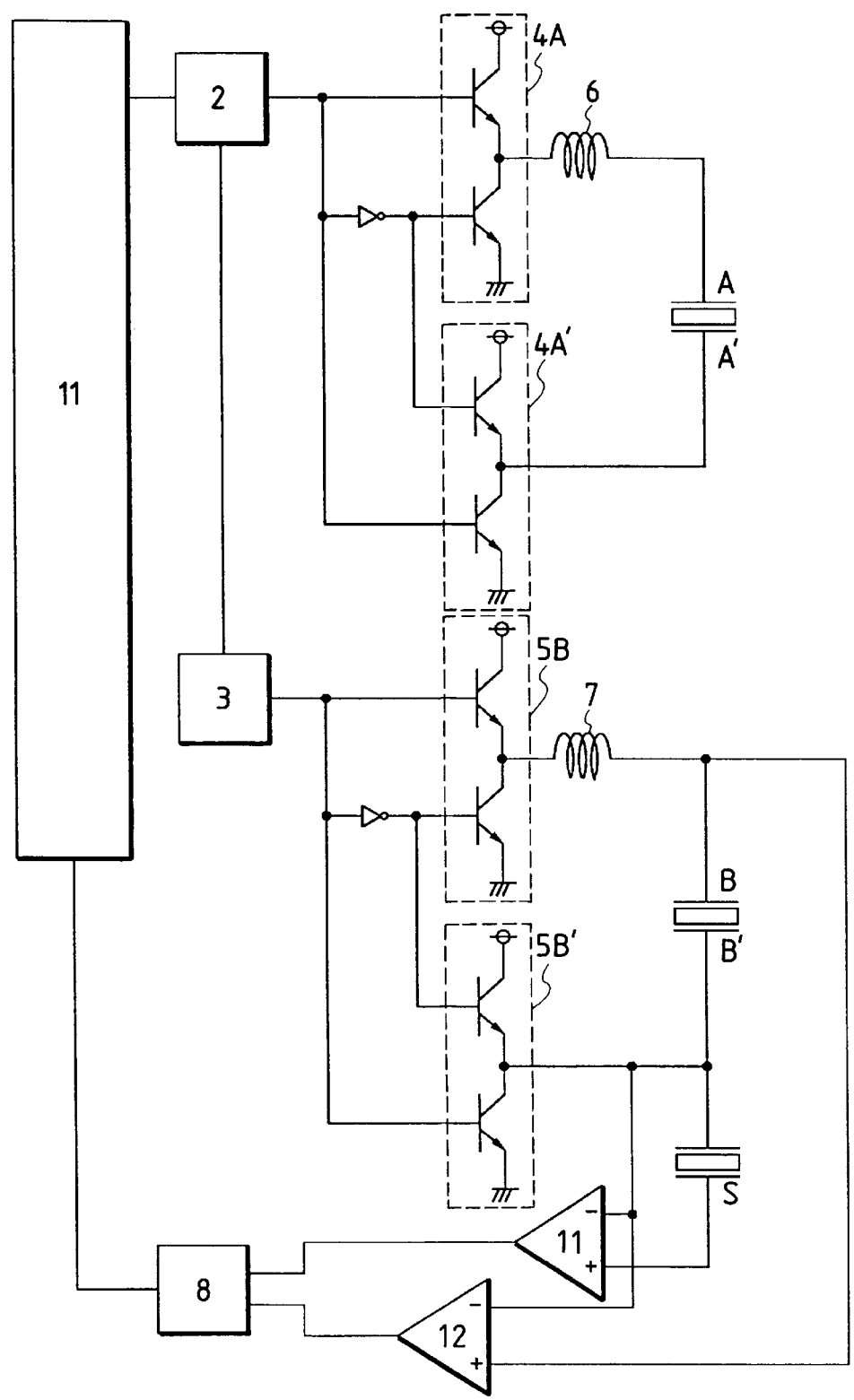
FIG. 8 is a block diagram showing a circuit according to the fourth embodiment of the present invention.
Figure 9:
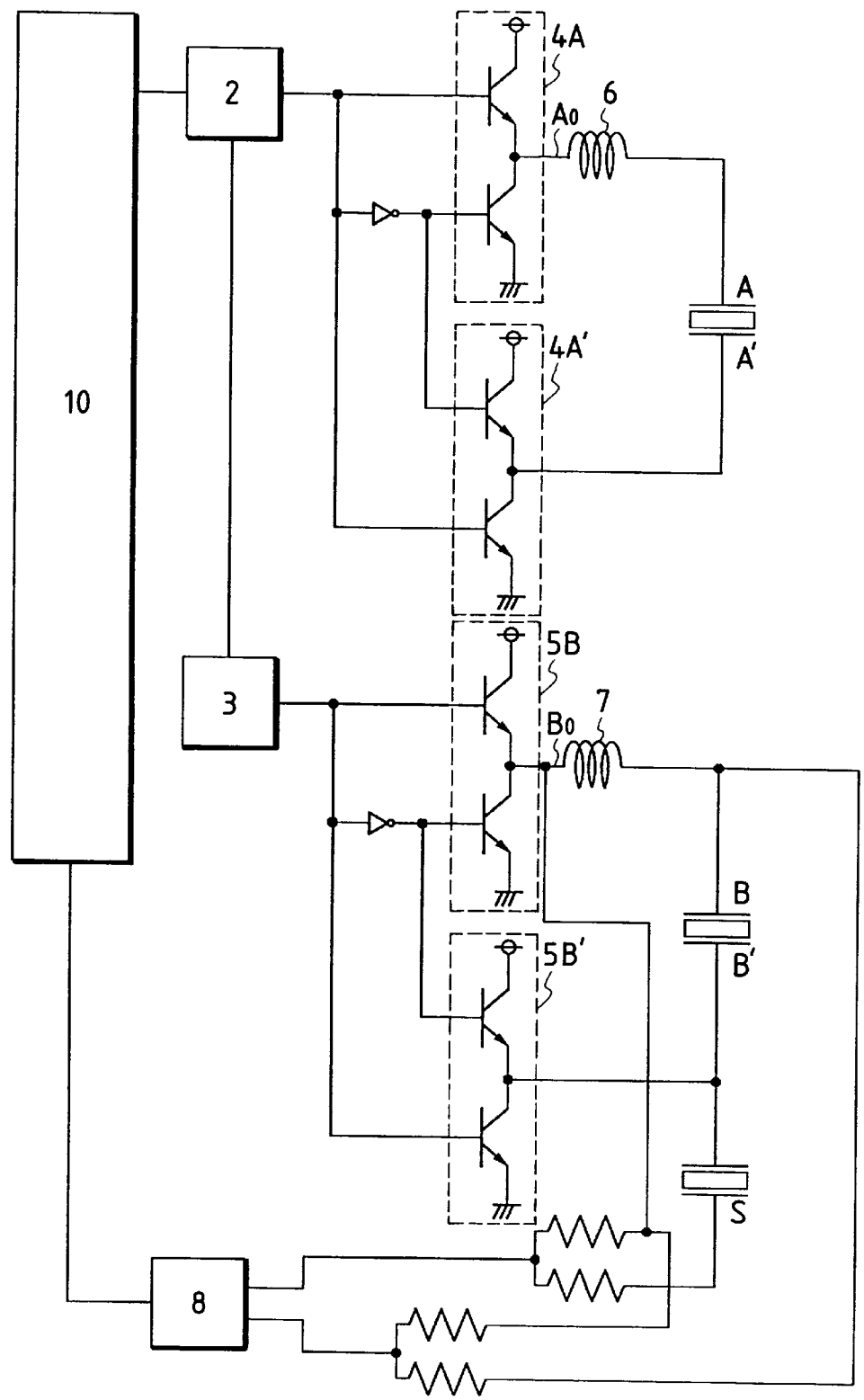
FIG. 9 is a block diagram showing another embodiment of the present invention.

FIGS. 8 and 9 are block diagrams each showing a circuit portion for driving a motor shown according to the fourth embodiment of the present invention and a circuit portion for detecting a vibration. In FIGS. 5 and 7, the signal from the vibration detection electrode S is compared with an A phase, while in this embodiment, a signal to be compared is changed to a B phase contacting the vibration detection piezoelectric element s. With this arrangement, since an electrode B' can be commonly used, the number of lines extracted from the motor can be decreased.

Figure 10:
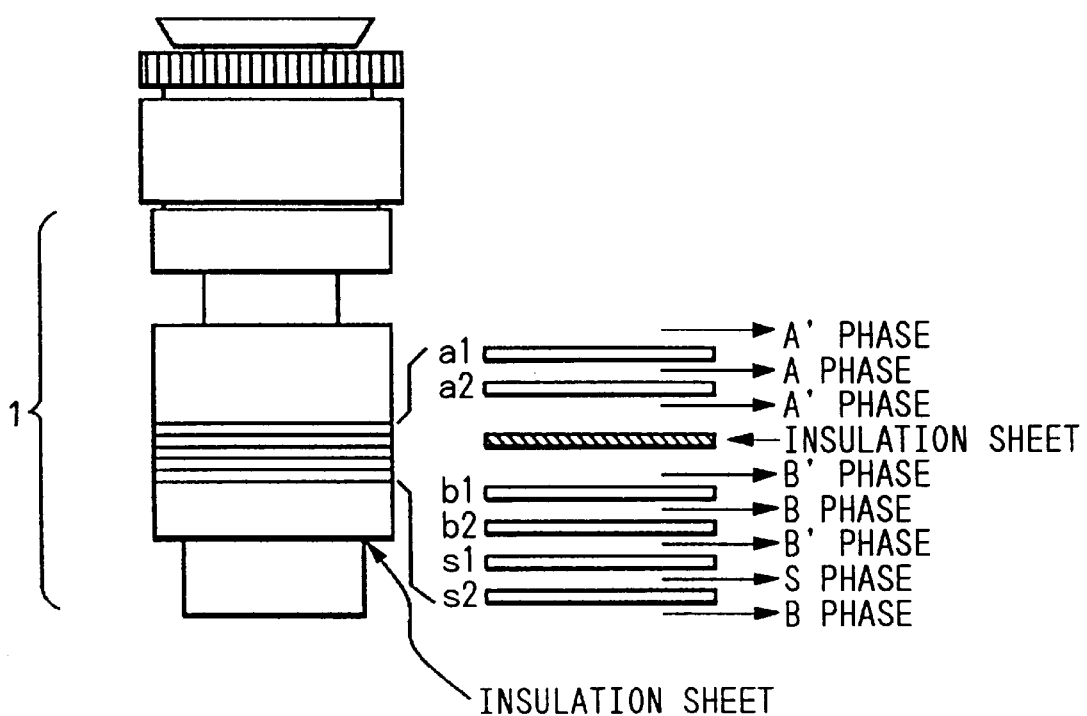
FIG. 10 is a side view of a bar-shape ultrasonic wave motor according to the fifth embodiment of the present invention.
Figure 11:
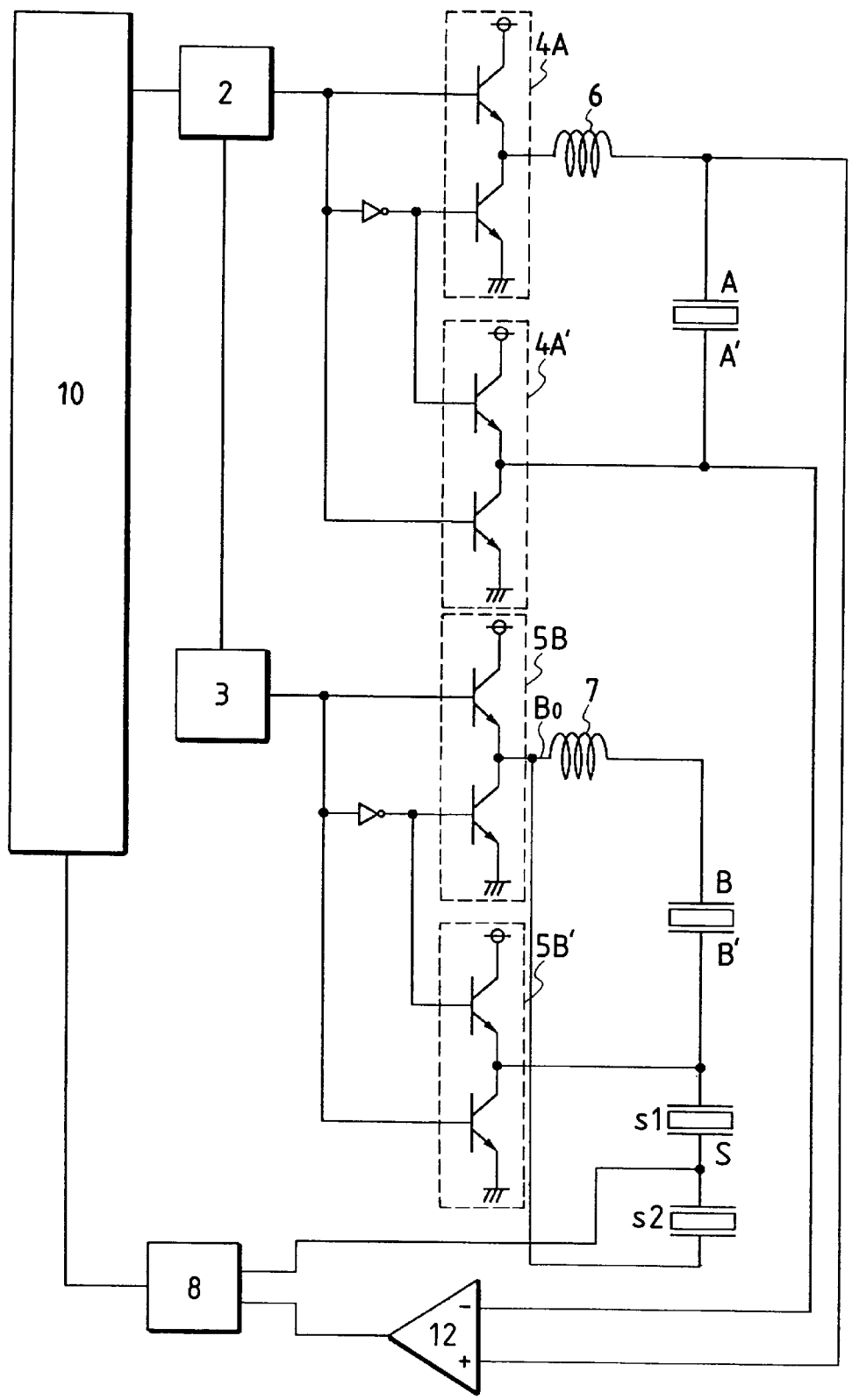
FIG. 11 is a block diagram showing a circuit according to the fifth embodiment of the present invention.

FIGS. 10 and 11 are respectively a side view of a motor and a block diagram of a circuit according to the fifth embodiment of the present invention. In FIG. 10, two vibration detection piezoelectric elements $S_1$ and $S_2$ are arranged, and an electrode S is extracted from the middle position between the elements $S_1$ and $S_2$. Note that piezoelectric elements $S_1$ and $S_2$ having the same characteristics are used.

Referring to FIG. 11, a signal B' is applied to one detection piezoelectric element $S_1$, and a voltage BO having a phase opposite to the signal B' is applied to the other detection piezoelectric element $S_2$, thereby mutually canceling the signals B0 and B'. Therefore, a regular vibration detection signal can be obtained from the vibration detection electrode S without requiring any circuitry processing. Thus, the number of circuit components can be decreased.

Figure 12:
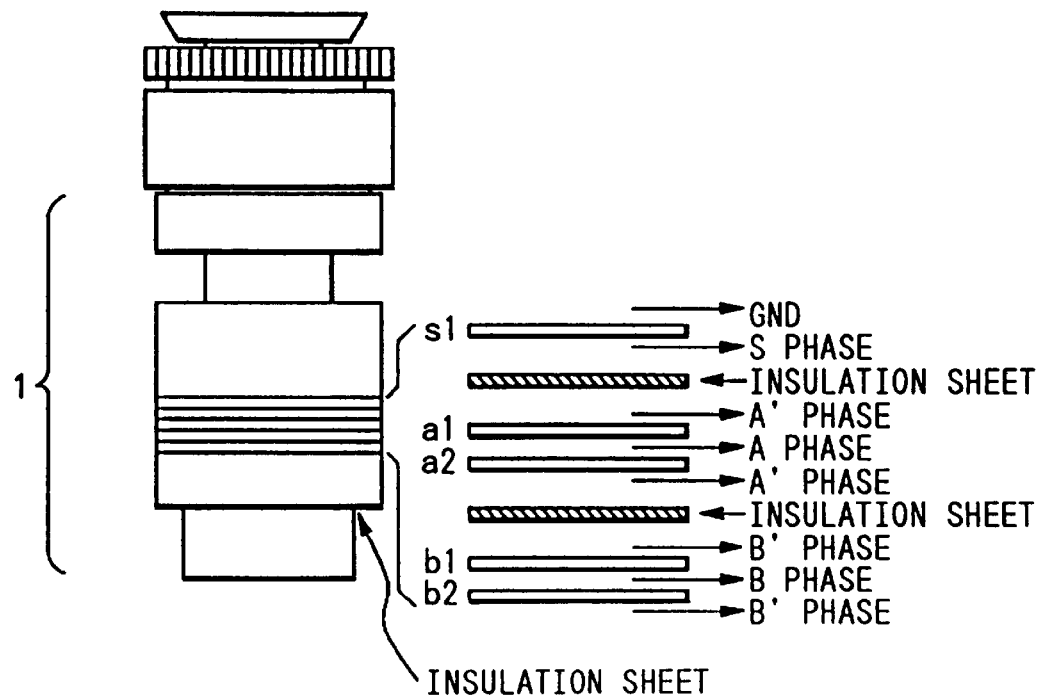
FIG. 12 is a side view of a bar-shape ultrasonic wave motor according to the sixth embodiment of the present invention.
Figure 13:
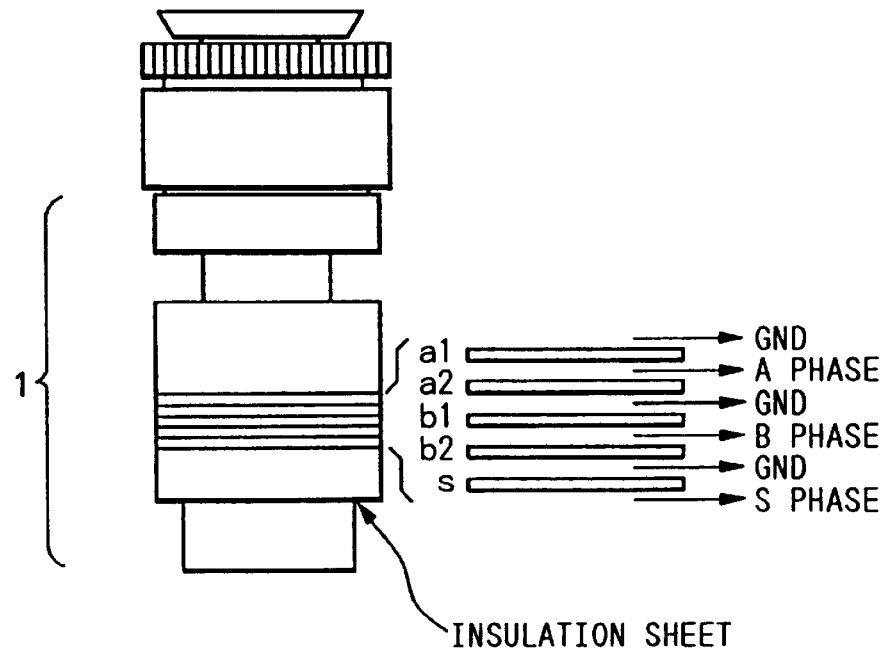
FIG. 13 is a side view of a conventional bar-shape ultrasonic wave motor.
Figure 14:
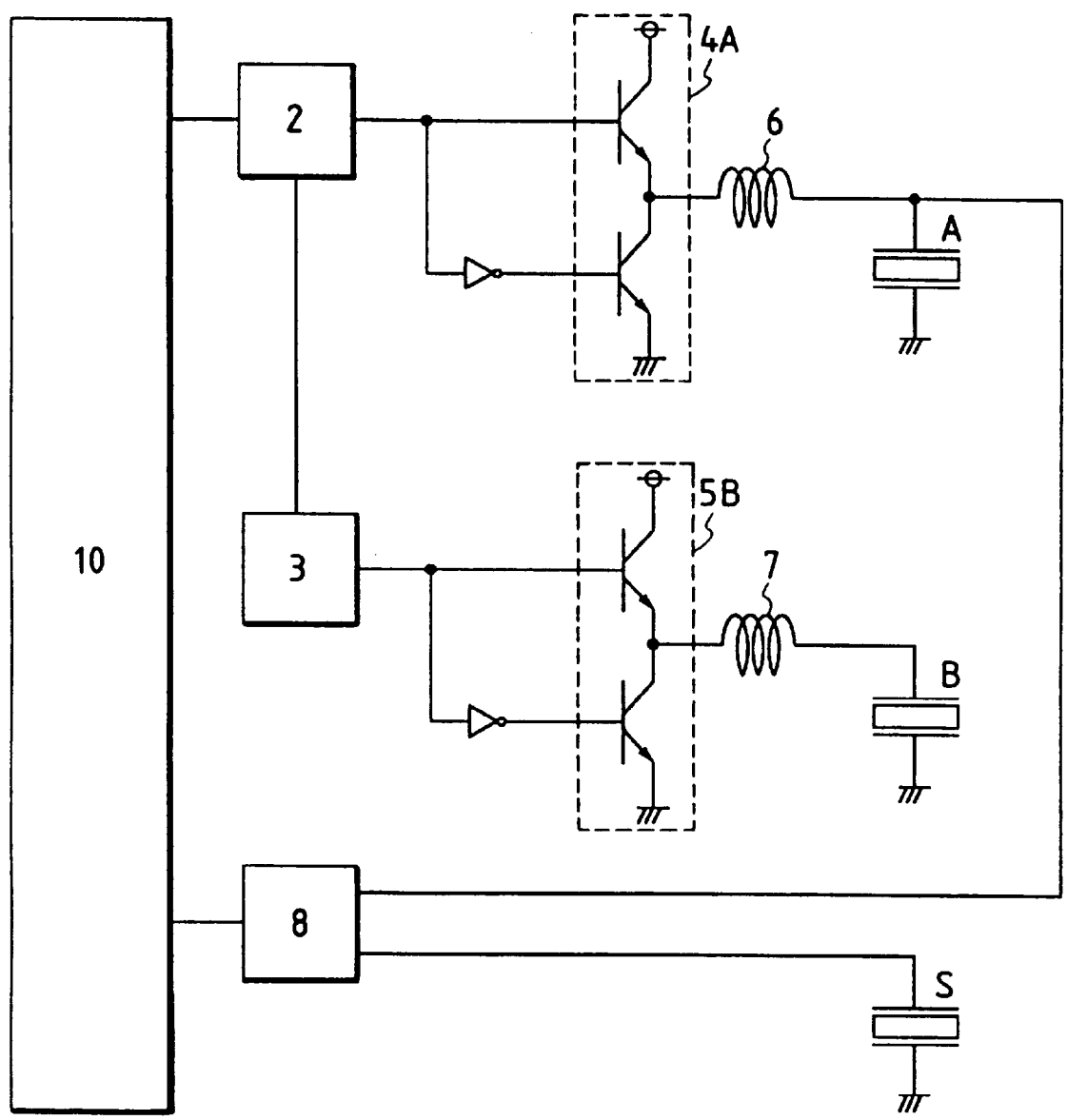
FIG. 14 is a block diagram showing a conventional circuit.

FIG. 12 is a side view which shows a bar-shape ultrasonic wave motor according to the sixth embodiment of the present invention, and also shows the arrangement of wiring lines for supplying voltages to piezoelectric elements arranged in the motor and for extracting an output voltage therefrom. In this embodiment, one end face of a vibration detection piezoelectric element is connected to the GND potential. With this arrangement, a regular vibration detection signal can be obtained from a vibration detection electrode S without requiring any circuitry processing. Therefore, vibration detection can be realized without increasing the number of piezoelectric elements unlike in the fifth embodiment.

In the above embodiments, conversion element for detection and conversion element for drive are provided in a different positions along a thickness direction, respectively. However, the element for detection, may be provided in a portion of the element for drive.

What is claimed is:

1. A vibration type drive device, comprising:
   an elastic member;
   a driving electro-mechanical energy conversion element portion having at least two driving electro-mechanical energy conversion elements, and arranged on said elastic member;
   a detection electro-mechanical energy conversion element portion electrically connected to said driving electro-mechanical energy conversion element;
   a driving circuit that applies driving frequency signals having different phases from each other to said at least two driving electro-mechanical energy conversion elements; and
   a cancel circuit, connected to an output of said detection electro-mechanical energy conversion element portion, and including means for cancelling a driving frequency signal component included in the output of the detection electro-mechanical energy conversion element portion and for extracting from the output of the detection electro-mechanical energy conversion element portion a component generated by vibration due to the driving frequency signal.

2. A device according to claim 1, wherein one surface of one of the driving electro-mechanical energy conversion elements is electrically connected to one surface of the detection electro-mechanical energy conversion element portion, and said cancel circuit comprises a synthesizing circuit for synthesizing a frequency signal applied to the driving electro-mechanical energy conversion element and an output from the detection electro-mechanical energy conversion element portion.

3. A device according to claim 2, wherein said synthesizing circuit comprises a subtraction circuit for performing a subtraction between a potential at a node between the driving electro-mechanical energy conversion element and detection electro-mechanical energy conversion element portion, and an output from the detection electro-mechanical energy conversion element portion.

4. A device according to claim 2, wherein said synthesizing circuit synthesizes a frequency signal applied to the other surface of the driving electro-mechanical energy conversion element and an output from the detection electro-mechanical energy conversion element portion.

5. A vibration type drive device in which at least one driving electro-mechanical energy conversion element portion and a detection electro-mechanical energy conversion element portion are arranged on an elastic member, said device comprising:
   (a) first and second electro-mechanical energy conversion element portions, one-surface sides of which are connected to each other via a ground electrode;
   (b) a driving circuit for applying a first frequency signal to the other surface of said first electro-mechanical energy conversion element portion, and applying a second frequency signal, having a phase different from a phase of the first frequency signal, to the other surface of said second electro-mechanical energy conversion element portion;
   (c) a detection electro-mechanical energy conversion element portion having one surface electrically connected to the other surface of said second electro-mechanical energy conversion element portion; and
   (d) a synthesizing circuit for synthesizing an output from the other surface of said detection electro-mechanical energy conversion element portion and a potential of the other surface of said second electro-mechanical energy conversion element portion.

6. A vibration type drive device in which at least one driving electro-mechanical energy conversion element portion and a detection electro-mechanical energy conversion element portion are arranged on an elastic member, said device comprising:

(a) first and second electro-mechanical energy conversion element portions;

(b) a driving circuit for alternately applying a predetermined voltage to one surface and the other surface of said first electro-mechanical energy conversion element portion, and alternately applying the predetermined voltage to one surface and the other surface of said second electro-mechanical energy conversion element portion at timings different from application timings of the predetermined voltage to said first electro-mechanical energy conversion element portion;

(c) a detection electro-mechanical energy conversion element portion having one surface electrically connected to said other surface of said second electro-mechanical energy conversion element portion; and (d) a cancel circuit for synthesizing an output from the other surface of said detection electro-mechanical energy conversion element portion and a potential to be applied to said other surface of said second electro-mechanical energy conversion element portion to cancel a driving signal component included in an output from said detection electro-mechanical energy conversion element portion.

7. A device according to claim 6, further comprising:

a calculation circuit for calculating a potential difference between one surface and the other surface of said first electro-mechanical energy conversion element portion; and a detection circuit for detecting a phase difference between outputs from said calculation circuit and said cancel circuit.

8. A vibration type drive device in which at least one driving electro-mechanical energy conversion element portion and a detection electro-mechanical energy conversion element portion are arranged on an elastic member, said device comprising:

(a) first and second electro-mechanical energy conversion element portions;

(b) a driving circuit for alternately applying a predetermined voltage to one surface and the other surface of said first electro-mechanical energy conversion element portion, and alternately applying the predetermined voltage to one surface and the other surface of said second electro-mechanical energy conversion element portion at timings different from application timings of the predetermined voltage to said first electro-mechanical energy conversion element portion;

(c) a first detection electro-mechanical energy conversion element portion having one surface electrically connected to said other surface of said second electro-mechanical energy conversion element portion; and (d) a cancel circuit for synthesizing an output from the other surface of said first detection electro-mechanically energy conversion element portion and a potential to be supplied to said one surface of said second electro-mechanical energy conversion element portion to cancel a driving signal component included in an output from said first detection electro-mechanical energy conversion element portion.

9. A device according to claim 6, further comprising:

a calculation circuit for calculating a potential difference between one surface and the other surface of said second electro-mechanical energy conversion element portion; and a detection circuit for detecting a phase difference between outputs from said calculation circuit and said cancel circuit.

10. A vibration type drive device in which at least one driving electro-mechanical energy conversion element portion and a detection electro-mechanical energy conversion element portion are arranged on an elastic member, comprising:

(a) first and second electro-mechanical energy conversion element portions;

(b) a driving circuit for alternately applying a predetermined voltage to one surface and the other surface of said first electro-mechanical energy conversion element portion, and alternately applying the predetermined voltage to one surface and the other surface of said second electro-mechanical energy conversion element portion at timings different from application timings of the predetermined voltage to said first electro-mechanical energy conversion element portion;

(c) a first detection electro-mechanical energy conversion element portion having one surface electrically connected to said other surface of said second electro-mechanical energy conversion element portion;

(d) a second detection electro-mechanical energy conversion element portion having one surface electrically connected to said one surface of said second electro-mechanical energy conversion element portion; and (e) synthesizing means for synthesizing an output from the other surface of said second detection electro-mechanical energy conversion element portion and an output from the other surface of said first detection electro-mechanical energy conversion element portion.

11. A vibration type drive device, comprising:

an elastic member;

a driving electro-mechanical energy conversion element portion having at least two driving electro-mechanical energy conversion elements, and arranged on said elastic member, said driving electro-mechanical energy conversion element having two side surfaces;

a detection electro-mechanical energy conversion element, said detection electro-mechanical energy conversion element having two side surfaces, one side surface of said detecting electro-mechanical energy conversion element being electrically connected to one of said two side surfaces of one of said driving electro-mechanical energy conversion elements;

a driving circuit connected to each of said two side surfaces of said driving electro-mechanical energy conversion element, said driving circuit applying driving frequency signals having different phases from each other to said two side surfaces of said driving electro-mechanical energy conversion element; and a cancel circuit, electrically connected to the other of said two side surfaces of said detection electro-mechanical energy conversion element, and including means for cancelling a driving frequency signal component included in an output of the detection electro-mechanical energy conversion element and for extracting from the output of the detection electro-mechanical energy conversion element a component generated by vibration due to the driving frequency signal.

\* \* \* \* \*

UNITED STATES PATENT AND TRADEMARK OFFICE
CERTIFICATE OF CORRECTION

PATENT NO. : 6,177,753 B1
DATED : January 23, 2001
INVENTOR(S) : Akio Atsuta

It is certified that error appears in the above-identified patent and that said Letters Patent is hereby corrected as shown below:

<u>Title page,</u>
Item [57] ABSTRACT,
Line 1, "detection" should read -- wave motor in which a vibration detection --.
Line 4, "vibration" should read -- This vibration --.

<u>Column 5,</u>
Line 66, "a" should be deleted.

Signed and Sealed this

Twenty-ninth Day of January, 2002

Attest:

JAMES E. ROGAN
*Attesting Officer*  *Director of the United States Patent and Trademark Office*